UNITED STATES PATENT OFFICE.

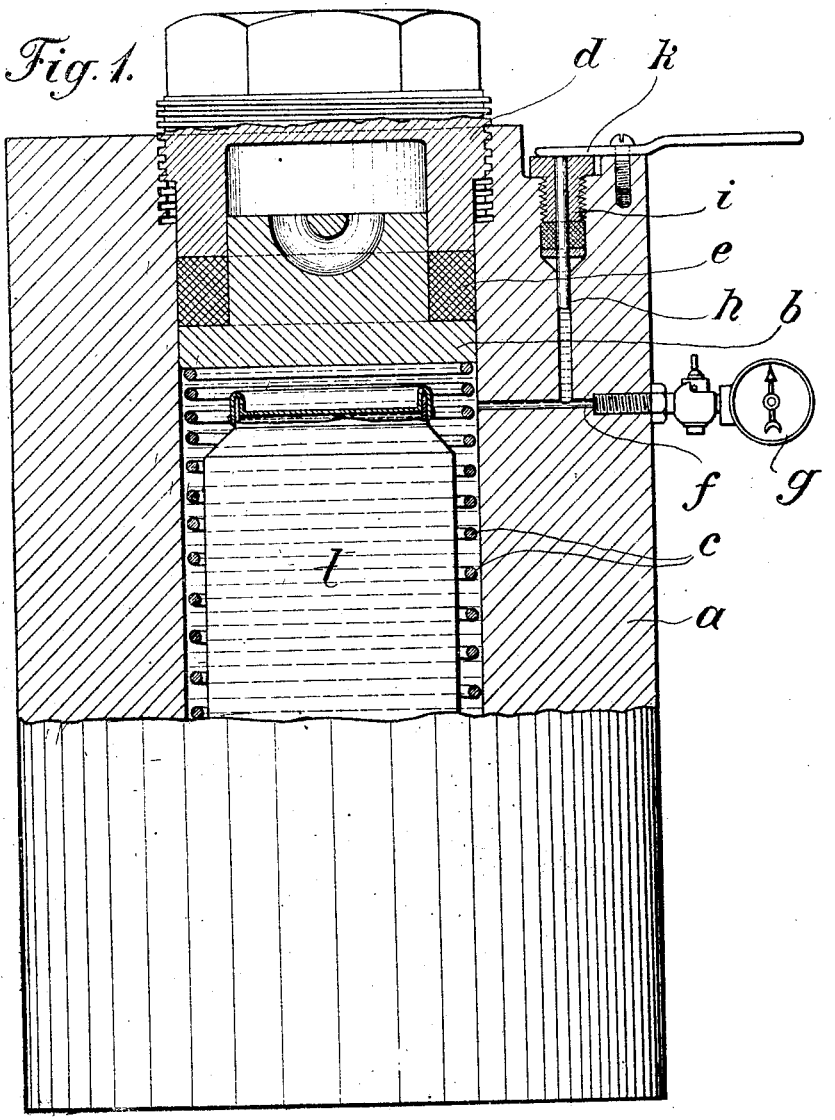

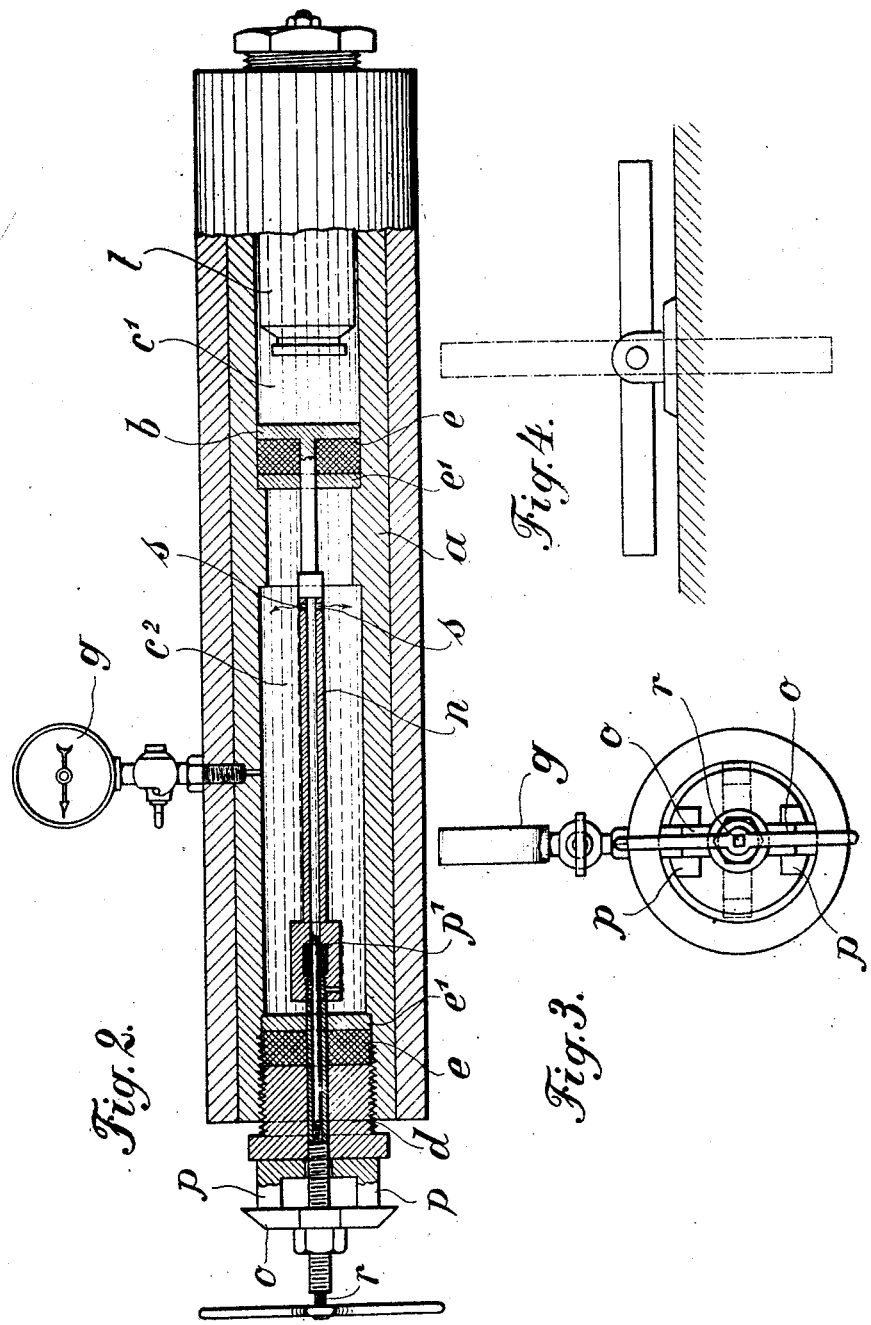

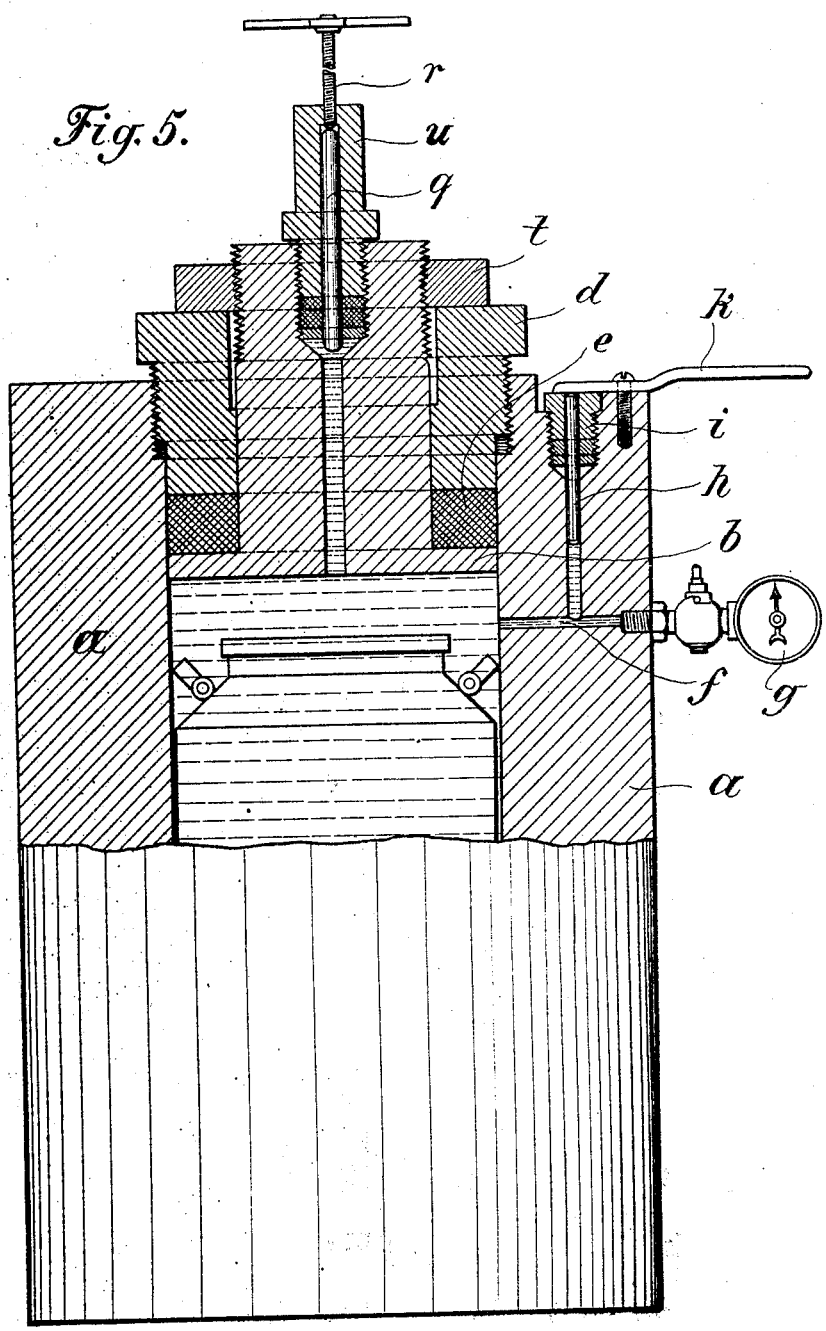

FRITZ GARPHEIDE, OF SOLINGEN, GERMANY, ASSIGNOR TO ARTHUR BENNINGHOVEN, OF WIESBADEN, GERMANY.

APPARATUS FOR TREATING FOOD ARTICLES.

1,115,806.

Specification of Letters Patent. Patented Nov. 3, 1914.

Application filed January 17, 1914. Serial No. 812,634.

*To all whom it may concern:*

Be it known that I, FRITZ GARPHEIDE, a subject of the German Emperor, and a resident of 16 Sonnenstrasse, Solingen, Germany, have invented certain new and useful Improvements in Apparatus for Treating Food Articles, of which the following is a statement.

The present invention relates to an arrangement for sterilizing and preserving milk and other victuals, in which the sterilization or preservation respectively is obtained in known manner by the action of a high constant pressure, which may, if necessary, be suddenly discontinued or by the intermittent action of such pressure on the material to be sterilized or on the preserving means and the material to be preserved contained therein. Hydraulic presses similar to the arrangement according to the present invention are already known. But it could not be foreseen, that such presses would be suitable for sterilizing or preserving milk and the like, while on the other hand the known presses are neither so constructed, that the vessels containing the milk or the like to be sterilized can be quickly introduced into the press cylinder and removed therefrom and yet be within a short time exposed to the action of a sufficiently high pressure.

In the accompanying drawings several constructional forms of the arrangement are exemplified.

Figure 1 is a longitudinal section through the one constructional form, which serves both for producing a high pressure and also for suddenly releasing this pressure. Fig. 2, is a longitudinal section of a modification; Fig. 3, a plan of Fig. 2; Fig. 4, a diagram illustrating a pivotal arrangement of the apparatus, and Fig. 5, a longitudinal section of a further modification.

The arrangement consists essentially of a pressure cylinder $a$ filled with the pressure medium. In this cylinder $a$ the plunger $b$ is displaceable contrary to the action of a spring $c$ provided in the said cylinder $a$. The movement of the plunger is obtained by means of a threaded part or cap $d$ screwable into the bore of the cylinder. This threaded part is hollowed out on the inner side and fits with this hollow over the correspondingly reduced upper end of the plunger $b$. When the part is screwed down it therefore bears on a packing ring $e$ resting on the shoulder of the plunger and by such means acts on the plunger itself. From the interior of the cylinder a transverse bore $f$ leads toward outside, where it is fitted with a pressure gage at its end. From this transverse bore $f$ a longitudinal bore parallel to the bore of the cylinder leads upward and contains a thin, boltlike plunger $h$ moving in a stuffing box $i$. This bolt plunger $h$ is held in its position or may be released therefrom by a lever $k$ pivotally fitted to the top of the cylinder.

The manipulation and operation of the arrangement for sterilizing is as follows: After the threaded part $d$ and the plunger $b$ have been removed from the cylinder $a$ the material to be sterilized is placed into the cylinder in a completely filled vessel $l$. When the material is not liquid, a suitable liquid will have to be added so that, by all means, the vessel is completely filled. The vessel $l$ is made of either an elastic or flexible material or with an elastic, pistonlike seal. After this vessel has been placed into the cylinder, the apparatus is filled with the pressure fluid and then the plunger $b$ and the threaded part $d$ are again fitted into the cylinder and the threaded part is screwed down. In consequence of the contrary action of the spring $c$ the packing material $e$ is thereby compressed and bulges out at the sides so that a perfectly tight joint is obtained. When the part $d$ is screwed down still farther, the resistance of the spring $c$ is overcome and thence a great pressure is exerted on the press liquid. Thereby a high hydraulic pressure is produced in the machine, which is communicated to the material to be sterilized in the vessel $l$, as the latter is made of an elastic material or has at least, as said hereinbefore, an elastic seal. This pressure compresses at the same time the packing material more and more thus forcing it against the wall of the cylinder. The vessel is however not in any way damaged by the high pressure, as the outer and the inner pressure will compensate each other. The height of the pressure is read on the pressure gage $g$. With delicate germs, this method of sterilizing has proved effective as such germs are killed by the high pressure. The pressure in this case amounts to several thousand atmospheres.

If tough germs have to be destroyed, which it is improbable a constant pressure will kill, the lever $k$ is turned aside, so that the small plunger $h$ is released. In consequence of the pressure prevailing within the apparatus this plunger is shot up with a loud report and a part of the liquid will follow. The result is a sudden drop in the pressure in the cylinder and in the vessel $l$. By such sudden drop of the pressure even tough germs are killed.

When the arrangement is to be used for preserving or pickling hams, the cylinder $a$ is filled with brine after the hams or the like have been placed into it and then a sufficiently high pressure is exerted on them by means of the plunger $b$ and the threaded part $d$. By this pressure the brine is quickly forced into the pores of the ham and the latter is pickled within a short time.

With the constructional form of the arrangement shown in Figs. 2 and 3, high pressure impulses are to be exerted. The same as with the afore described constructional form we here have a cylinder $a$ to be filled with a pressure liquid, in the lower part of which cylinder is placed the vessel $l$ with the material to be sterilized or preserved. The plunger $b$ is, however, here arranged not only over but also in the pressure liquid in the cylinder, so that the latter is divided thereby into two pressure chambers $c^1$ and $c^2$, of which the latter is connected with the pressure gage $g$. The plunger $b$ is not directly under action of the threaded part closing the top of the cylinder, but bears by a concentrically arranged rod $n$, bored through almost its entire length, and a cross piece $o$ adjustably fitted to the threaded upper end of the rod on two studs $p$ projecting upward from the threaded part $d$. A tight joint between the plunger and the threaded part and the wall of the cylinder respectively is obtained by means of a packing $e$ placed on the facing surfaces and by the disks $e^1$, which rest against shoulders in the inner wall of the cylinder. In the rod $n$ a bolt-shaped small plunger $p^1$ is adjustably fitted by means of a screw spindle $r$ and forms a tight joint therein. The cavity within the bored rod $n$ communicates below by means of transverse bores $s$ with the one chamber $c^2$ of the cylinder.

When the vessel $l$ containing the material to be sterilized or the material to be preserved has been placed into the cylinder and its chambers $c^1$, $c^2$ have been filled with the pressure liquid or the preserving liquid respectively, the screw spindle $r$ is turned and thereby the plunger bolt $p^1$ is screwed into the cavity of the rod $n$ which may, if desirable also be filled with the liquid. The pressure thereby exerted in the cavity of the rod on the liquid contained therein is transmitted through the transverse bores $s$ to the liquid in the chamber $c^2$ so that here a high pressure is produced, which may be read on the pressure gage $g$. When the required pressure has been reached, the cross piece $o$ is turned away from the supporting stud $p$, whereby it loses its support (see Fig. 3, dot-and-dash lines). The pressure on the plunger $b$ then suddenly drives the latter into the chamber $c^1$, whereby the pressure on the liquid contained in this chamber is suddenly increased. Thence the pressure is transmitted to the material to be sterilized or preserved. By these sudden pressure impulses all bacteria contained in the material to be sterilized, and even the toughest, are killed, or the preserving medium is forced into the pores of the material to be preserved or sucked into them.

The third constructional form illustrated in Fig. 5 differs from the first form hereinbefore described only in that the plunger $b$ which passes with its upper reduced portion through the threaded part $d$ is centrally bored through its whole length, and that, similar to the arrangement shown in Fig. 2, a bolt-shaped small plunger $q$ can be moved forward into this bore or its stuffing box respectively by means of a screw spindle $r$. The plunger $b$ is threaded at the top of its reduced end and held by nuts $t$ to the threaded part $d$, so that the supporting spring as in Fig. 1 can be omitted. After the material to be sterilized or preserved respectively has been introduced into the cylinder $a$ and the plunger $b$ with the threaded part $d$ has been fitted in position, the nut $t$ is first tightened, so that the packing between the two parts is compressed and bulged out at the sides thereby producing a tight joint. Then the pressure liquid is filled through the longitudinal bore of the plunger into the cylinder $a$ up to the rim, or is refilled respectively, in case liquid had been previously contained therein. After the stuffing gland $u$ with the plunger $q$ have been fitted the cap is tightened further whereby already a high pressure is produced. The final highest pressure is produced by driving in the plunger $q$ by means of the screw spindle $r$. By turning aside the lever $k$ the pressure may be again released, in the same manner as hereinbefore described.

The diagram Fig. 4 illustrates the arrangement journaled like the beam of a balance. This has, among others, the object to prevent the pressure liquid from running out during the charging operation (indicated by the position shown in dotted lines).

It is obvious that various changes may be made in the details of construction of the apparatus, without departing from the spirit of my invention.

I claim:

1. An apparatus for treating a food article, comprising a threaded receptacle adapted to receive said article and also a fluid medium surrounding the article, a screw cap tapped into the receptacle, a packing within the receptacle adapted to be engaged by the screw cap, and a plunger projecting into the screw cap, and adapted to be forced into the receptacle.

2. An apparatus for treating a food article, comprising a receptacle adapted to receive said article and also a fluid medium surrounding the article, a perforated main plunger slidable within the receptacle, means for advancing the main plunger against said medium, an auxiliary plunger engaging the main plunger, and means for advancing said auxiliary plunger within said main plunger.

3. An apparatus for treating a food article, comprising a receptacle adapted to receive said article and also a fluid medium surrounding the article, a perforated main plunger slidable within the receptacle, a cap screwed into the receptacle and adapted to advance the plunger against said medium and thereby subject the same to a preliminary pressure, an auxiliary plunger movable within the main plunger, means for advancing the auxiliary plunger to subject the medium to final pressure, and means independent of both plungers for suddenly relaxing said pressure.

4. An apparatus for treating a food article, comprising a receptacle adapted to receive said article and also a fluid medium surrounding the article, a perforated main plunger slidable within the receptacle, a cap screwed into the receptacle and adapted to advance the plunger against said medium and thereby subject the same to a preliminary pressure, an auxiliary plunger movable within the main plunger, means for advancing the auxiliary plunger to subject the medium to final pressure, a duct communicating with the receptacle, a bolt controlling said duct, and means for releasing said bolt.

In testimony whereof I have hereunto affixed my signature in the presence of two subscribing witnesses.

FRITZ GARPHEIDE. [L. S.]

Witnesses:
  HELEN NUFER,
  ALBERT NUFER.